United States Patent [19]
Bodhaine et al.

[11] Patent Number: 6,047,767
[45] Date of Patent: Apr. 11, 2000

[54] HEAT EXCHANGER

[75] Inventors: Jim Bodhaine; Hany E. Hassanein, both of Houston, Tex.

[73] Assignee: Vita International, Inc., Houston, Tex.

[21] Appl. No.: 09/063,603

[22] Filed: Apr. 21, 1998

[51] Int. Cl.[7] .................................................. F28D 7/10
[52] U.S. Cl. ......................... 165/141; 165/156; 165/163
[58] Field of Search ..................... 165/140, 141, 165/154, 155, 156, 163

[56] References Cited

U.S. PATENT DOCUMENTS

| | | | |
|---|---|---|---|
| 1,095,165 | 4/1914 | Ockel | 165/140 |
| 1,114,924 | 10/1914 | Skinner | 165/141 |
| 1,279,135 | 9/1918 | Manville | 165/140 |
| 1,526,320 | 2/1925 | Cook | 165/140 X |
| 1,922,149 | 8/1933 | Baumann | 165/156 |
| 3,131,553 | 5/1964 | Ross | 165/140 X |
| 4,197,712 | 4/1980 | Zwick . | |
| 4,241,043 | 12/1980 | Hetzel | 165/141 X |
| 4,290,271 | 9/1981 | Granger . | |
| 4,420,942 | 12/1983 | Davis . | |
| 4,576,005 | 3/1986 | Force . | |
| 4,586,338 | 5/1986 | Barrett . | |
| 4,599,868 | 7/1986 | Lutjens . | |
| 4,819,454 | 4/1989 | Brigham . | |
| 4,899,544 | 2/1990 | Boyd . | |
| 5,046,548 | 9/1991 | Tilly | 165/140 X |
| 5,095,709 | 3/1992 | Billiot . | |
| 5,228,505 | 7/1993 | Dempsey | 165/140 |
| 5,339,654 | 8/1994 | Cook et al. | 165/163 X |
| 5,551,242 | 9/1996 | Loesch . | |
| 5,713,216 | 2/1998 | Erickson | 165/163 X |

FOREIGN PATENT DOCUMENTS

| | | |
|---|---|---|
| 0 805 303 | 11/1997 | European Pat. Off. . |
| 1 192 240 | 10/1959 | France . |
| 2 479 436 | 10/1981 | France . |
| 2 660 056 | 9/1991 | France . |
| 1 936 782 | 2/1970 | Germany . |
| 16 01 222 | 7/1970 | Germany . |
| 27 08 337 | 8/1978 | Germany . |
| 31 17 431 | 3/1982 | Germany . |
| 82 00053 | 1/1982 | WIPO . |

OTHER PUBLICATIONS

Georgiev, Kovatchev: "Multichannel low Temperature Heat Exchanger"; Cryogenics, vol. 14, No. 1; Jan. 1974 (1974–01), pp. 25–28.

*Primary Examiner*—Leonard Leo
*Attorney, Agent, or Firm*—Paula D. Morris & Associates P.C.; Cynthia G. Seal

[57] ABSTRACT

A heat exchanger is disclosed having a first chamber, a second chamber positioned inside the first chamber, and a third chamber positioned inside the second chamber. The first, second, and third chambers are in coaxial alignment. A first portion of a first helical tube is positioned inside the second chamber and a second portion of the first helical tube is positioned inside the third chamber and a second helical tube is positioned inside the first chamber. The heat exchanger heats a cryogenic liquid to a gas phase using at least three different heat transfer fluids in one contained unit without mixing any of the fluids in the exchanger.

19 Claims, 4 Drawing Sheets

HEAT EXCHANGER

FIELD OF THE INVENTION

This invention relates to a multiphase heat exchanger that provides radial thermal heat transfer between a plurality of individually contained fluids.

BACKGROUND OF THE RELATED ARTS

Numerous operations are performed on oil and gas wells which require large volumes of nitrogen gas or other cryogenic fluids. These operations may be performed on both onshore and offshore wells. Such operations include foam fracturing operations, acidizing services, jetting down the tubing or down the tubing-casing annulus, nitrogen cushions for drill stem testing, pressure testing, insulation of the tubing-casing annulus to prevent such problems as paraffin precipitation, jetting with proppant for perforating and cutting operations, reduction of density of well workover fluids, displacement of well fluid from tubing during gun perforation operations to prevent excess hydrostatic pressure in the hole from pushing perforation debris into the formation, placing corrosion inhibitors by misting the inhibitor with nitrogen, extinguishing well fires, and other operations. Other operations that require cryogenic fluids at an ambient temperature include pipeline and vessel purging operations and refinery operations such as, recharging catalysts.

Nitrogen is typically stored in its liquid state because of the volume used however, liquid nitrogen will damage most carbon steel pipes used in oil and gas wells. Thus, various heating systems have been developed to raise the nitrogen to an ambient temperature. Typically, 185 BTUs per pound of nitrogen are required to heat the nitrogen to an ambient temperatures of 70° F.

One particular such operation is the fracturing of a subsurface formation of the well by pumping a fluid under very high pressure into the formation. The fracturing fluid which is pumped into the well often comprises a foamed gel which is produced by the use of nitrogen gas. The nitrogen for the foam fracturing operation is generally stored in a fluid form at temperatures of approximately –320° F.

At pressures encountered in these foam fracturing operations, the nitrogen changes state from a liquid to a gas at approximately –200° F. It is, therefore, desirable to heat up the nitrogen gas to a superheated state so that the foam fracturing fluid being pumped down the well will be at an essentially ambient temperature. This is because of the numerous adverse affects upon mechanical equipment of very low temperature which would otherwise be presented by the nitrogen foam.

With regard to land based wells, the nitrogen heating equipment generally includes open flame heaters. A problem is however, presented when performing foam fracturing operations on offshore wells. For safety and environmental reasons, open flames are generally not allowed on an offshore drilling platform. Therefore, it is necessary to provide a heater for the nitrogen which does not have an open flame.

Such flameless nitrogen heaters have previously been provided by utilizing the heat generated by an internal combustion engine and mechanical components driven thereby to heat a coolant fluid which transferred that heat to the nitrogen through a coolant fluid-to-nitrogen heat exchanger.

Numerous problems are encountered with prior art devices mainly because of the use of air as a heat transfer medium. Air is a notoriously poor heat transfer medium as compared to a liquid and the use of ambient air causes the system to be dependent upon ambient air conditions for proper operation. Additionally, due to the large bulky nature of the plenum chamber required for the use of air as a heat transfer medium, the air systems are typically very bulky and heavy. Therefore, there is a need for a flameless nitrogen unit that is compact in size, efficient in the heat transfer process, and economical.

SUMMARY OF THE INVENTION

The present invention provides a heat exchanger that collects heat from three sources generated by a drive system using an internal combustion engine and uses the heat to warm a fluid stream. The heat exchanger has three preferably cylindrical chambers one inside the other in coaxial alignment. The second chamber is positioned inside the first, and the third chamber is inside the second. Helical tubes are positioned inside the chambers to carry fluids for the heat exchange process. A first portion of a first helical tube is positioned inside the second chamber, and the second portion of the first helical tube is positioned in the third chamber. The second chamber has a hole in the wall to allow the passage of the second portion of the first tube into the third chamber. A second helical tube is positioned inside the first chamber.

Preferably, the first tube has a first fluid flow therethrough such as nitrogen or some other cryogenic fluid. The second tube has a second fluid flow therethrough, such as hydraulic fluid from the drive system. The second chamber has a third fluid flow therethrough, such as engine coolant, that also flows through the first chamber. Finally, the third chamber has a fourth fluid flow therethrough, such as exhaust from the engine. Preferably, the walls of the second and third chambers are made of a heat conducting material such as stainless steel or copper, so that the fluids flowing therethrough can benefit from radial heat transfer from one chamber to the next.

Alternatively, a third helical tube may be positioned inside the first chamber in parallel with the second helical tube. The third helical tube has a fifth fluid flow therethrough such as hydraulic fluid from the casing of the various pumps used in the drive system. In addition, the fifth fluid flow is preferably in a counter-flow relationship with the fluid flow inside the first chamber.

In a preferred embodiment, all of the fluids traveling through the heat exchanger are in a counter-flow relationship, such that, i.) the first fluid flow through the first portion of the first tube is in a counter-flow arrangement with the third fluid flow in the second chamber, ii.) the first fluid flow through the second portion of the first tube is in a counter-flow arrangement with the fluid flow in the third chamber, and iii) the second fluid flow through the second tube is in a counter-flow arrangement with the fluid flow in the first chamber.

In order to maximize the available surface area, the individual chambers of the heat exchanger may be equipped with spiral fins. The fins are positioned such that they spiral in the same orientation as the helical tubes within the chambers and they are positioned between the turns of the helical tubes. The spiral effect of the fins causes the fluid flow through the individual chambers to come into contact with all sides of the helical tubes. The fins can be positioned between each turn or some of the turns of the helical tubes.

The fourth fluid flow or exhaust passes through the third chamber and exposes the second portion of the first tube to the heat from the exhaust. The exhaust then exits through one end of the heat exchanger. In order to direct the flow from the exhaust, a cylindrical core with spiral fins may be positioned inside the third chamber. The cylindrical core acts to reduce sparks from the exhaust and disperse the flow of the exhaust gases to maximize the surface area of the tube exposed to the exhaust. The unit may also be equipped with a diffuser at each end and a cone shaped inlet and outlet for the exhaust gases to reduce engine noise.

Auxiliary pumps may be used to conduct the fluids through the helical tubes and the coolant through the chambers to compensate for the pressure drop that is incurred as the fluids flow through the heat exchanger.

In another embodiment, a system is provided for converting a liquid to a gas. The system includes a liquid source such as liquid nitrogen or other cryogenic fluid, a drive system including a pump, such as a triplex nitrogen pump connected to the liquid source. The drive system includes an internal combustion engine such as a diesel engine from Detroit, Caterpillar or other commercially available source for driving a hydraulic pump that provides hydraulic fluid to run a hydraulic motor that drives the nitrogen pump in addition to other pumps required to transport the fluids through the system. A heat exchanger is used for providing a first fluid flow, such as water, from the engine in heat exchange relationship with the liquid to heat and convert the liquid to a gaseous state. The heat exchanger further provides a second fluid flow, such as exhaust from the engine for further heating the cryogenic gas in a heat exchange relationship. The heat exchanger further provides a third fluid flow, such as hydraulic fluid from the drive system for heating the first fluid flow. The heat exchanger is designed such that the first fluid flow, second fluid flow, third fluid flow do not mix. Preferably, a fourth fluid flow, comprising casing hydraulic fluid from the pumps and motors, is provided in a heat exchange relationship with the first fluid flow.

It is preferred that the liquid is nitrogen, the first fluid flow is substantially water, the second fluid flow is substantially exhaust, and the third fluid flow is substantially hydraulic fluid, however other fluids may be substituted to achieve specific heat transfer goals of a particular system. A valve element may be positioned in communication with the gas flow as it exits the heat exchanger to control the temperature of the gas as it exits the heat exchanger. The heat exchanger is designed to provide maximum heat transfer with minimum heat loss to the atmosphere, to increase efficiency and lower the cost of providing cryogenic fluids at an acceptable temperature.

BRIEF DESCRIPTION OF THE DRAWINGS

So that the above recited features and advantages of the present invention can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1:
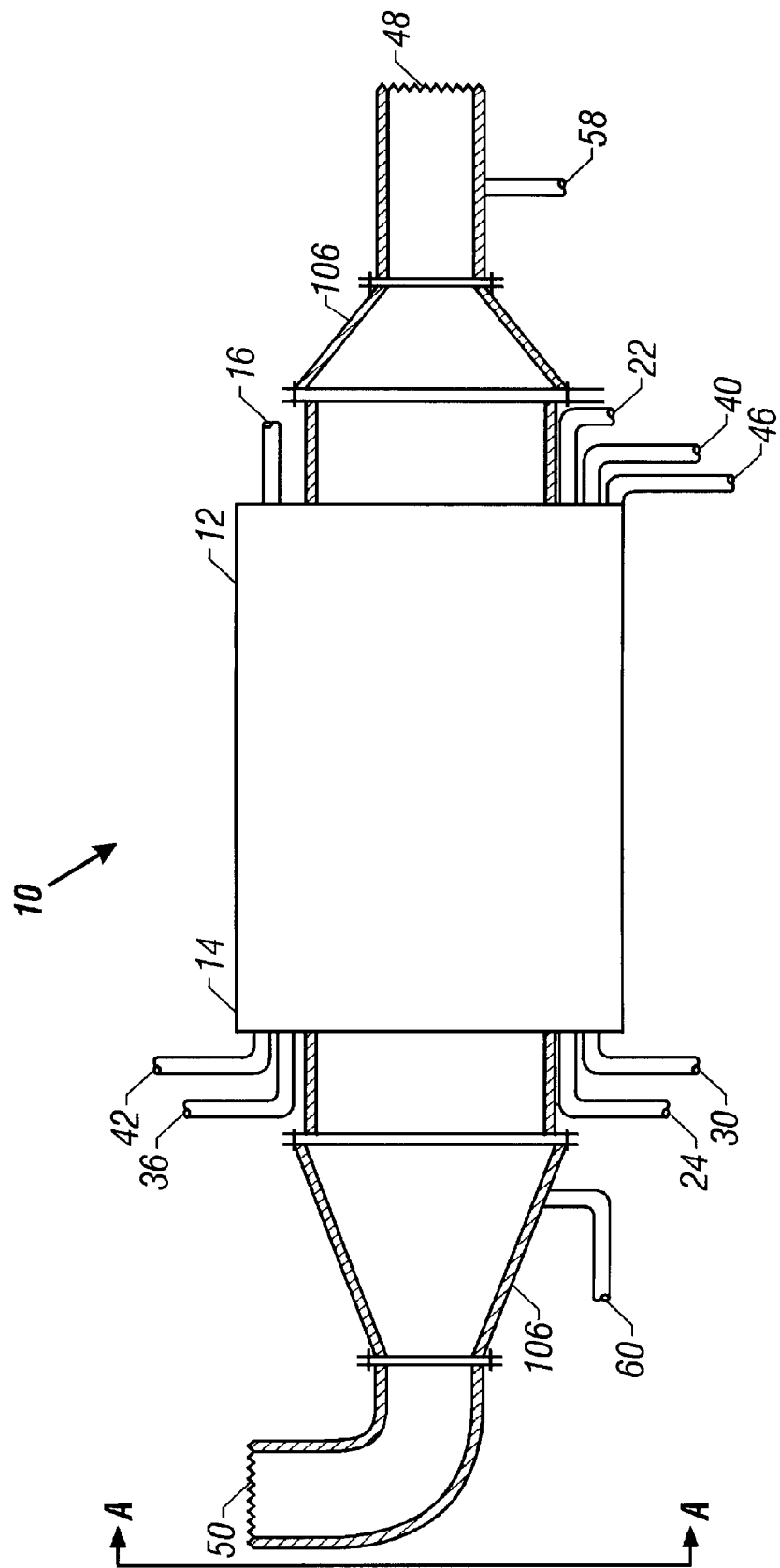
FIG. 1 is a perspective view of the heat exchanger of the present invention.

One aspect of the present invention provides a heat exchanger that collects heat through radiant transfer from coolant fluid and exhaust gases and transfers the heat to the liquid nitrogen. The liquid nitrogen is exposed to the heat from the engine coolant and is converted to a gas. Once in the gas phase, the nitrogen is further heated by the exhaust gases and exits the heat exchanger at a controllable temperature of from 70–150° F. During the heat transfer process, the engine coolant gives up heat to the nitrogen and is overcooled by the liquid nitrogen. The overcooled coolant then travels to the hydraulic chamber and absorbs the heat from the hydraulic fluids thus reducing the temperature of the hydraulic fluid. The coolant then travels out of the heat exchanger and back into the engine. The nitrogen liquid travels in one direction down the heat exchanger through the second chamber, at the opposite end of the heat exchanger, the nitrogen, now a gas, reverses direction and travels in the opposite direction in the third chamber. While in the third chamber, the nitrogen gas is further warmed by the exhaust stream flowing over the tube carrying the nitrogen. The nitrogen then exits the heat exchanger for use in the desired application. The hydraulic fluid is contained in a hydraulic tube positioned in a first chamber that is filled with circulating coolant that has been cooled by the liquid nitrogen in a second chamber. Preferably, all the fluids in this system flow in a counter flow arrangement to maximize the radiant heat transfer process. The heat exchanger reduces the amount of heat lost, thereby increasing the efficiency of the heat transfer, and reducing the size engine required to generate heat. Using a smaller engine will save space as well as money for the operator.

The temperature of the nitrogen exiting the system is related to the amount of heat generated by the system. The heat generated by the system can be balanced by controlling the velocities of fluids flowing through the heat exchanger. The engine runs at a constant speed, therefore, the coolant velocity is relatively constant. The nitrogen is delivered through a hydraulically driven nitrogen pump that is powered by a hydraulic motor, which is supplied with hydraulic fluid from the engine hydraulic pump. The nitrogen flow rate dictates the amount of horsepower output required from the hydraulic motor. A high nitrogen flow rate increases the amount of hydraulic oil demand from the engine, and increases the horsepower output, which in turn increases the heat created by the oil, coolant, and exhaust.

In another aspect of the invention, there is provided a heat exchanger that employs a radial design for transferring heat from several sources into a fluid stream in one contained unit. The design includes a radial arrangement of flow tubes and chambers that are self-contained to reduce heat loss from one heat transfer phase to the next. The unit is designed to provide multiphase heat transfer using coolant, hydraulic fluid and exhaust from an external engine to heat liquid nitrogen, cool hydraulic fluid as well as reduce the temperature of waste exhaust. The heat exchanger is based on overcooling of the engine coolant by loosing heat to the liquid nitrogen or other cryogenic fluid, then using the overcooled coolant to withdraw heat from the hydraulic fluids in an efficient manner. In addition, cryogenic fluids that are normally vented to atmosphere during cool downs or pump priming, can be vented directly into the exhaust stream, further cooling the exhaust and vaporizing the cryogenic fluids prior to entry to the atmosphere.

In yet another aspect of the present invention, there is provided a radially designed heat exchanger that muffles the exhaust coming from the engine. The exhaust is fed through a cone and a diffuser to a cylindrical core having spiral fins inside the heat exchanger that reduces noise and acts as a spark arrestor.

For example, the heat exchanger of the present invention may be used to heat and/or vaporize nitrogen at a rate of 180K scf/h from −320 F. to 115 F. using a 315 HP engine. Currently available systems require a 380 HP engine to achieve similar results.

FIG. 1 is a perspective view of the heat exchanger 10 of the present invention. The heat exchanger 10 has a first end 12 and a second end 14. A liquid nitrogen inlet 16 is located near the first end 12 and a gaseous nitrogen outlet 22 is located near the first end. The engine coolant enters the heat exchanger 10 through coolant inlet 24 and exits through coolant outlet 30. The engine main hydraulic fluid enters through hydraulic inlet 36 and exits through hydraulic outlet 40. The case hydraulic fluid enters through inlet 42 and exits through outlet 46. The engine exhaust enters through exhaust inlet 48 and exits through exhaust outlet 50. Nitrogen that is normally vented to the atmosphere from various pumps, can be vented into the exhaust stream through a vent line 58. If the engine is working very hard and producing exhaust that is too hot to be vented to the atmosphere, the exhaust can be cooled by injecting a small amount of liquid nitrogen into the exhaust stream near the second end of the heat exchanger 10 through inlet 60.

Figure 2:
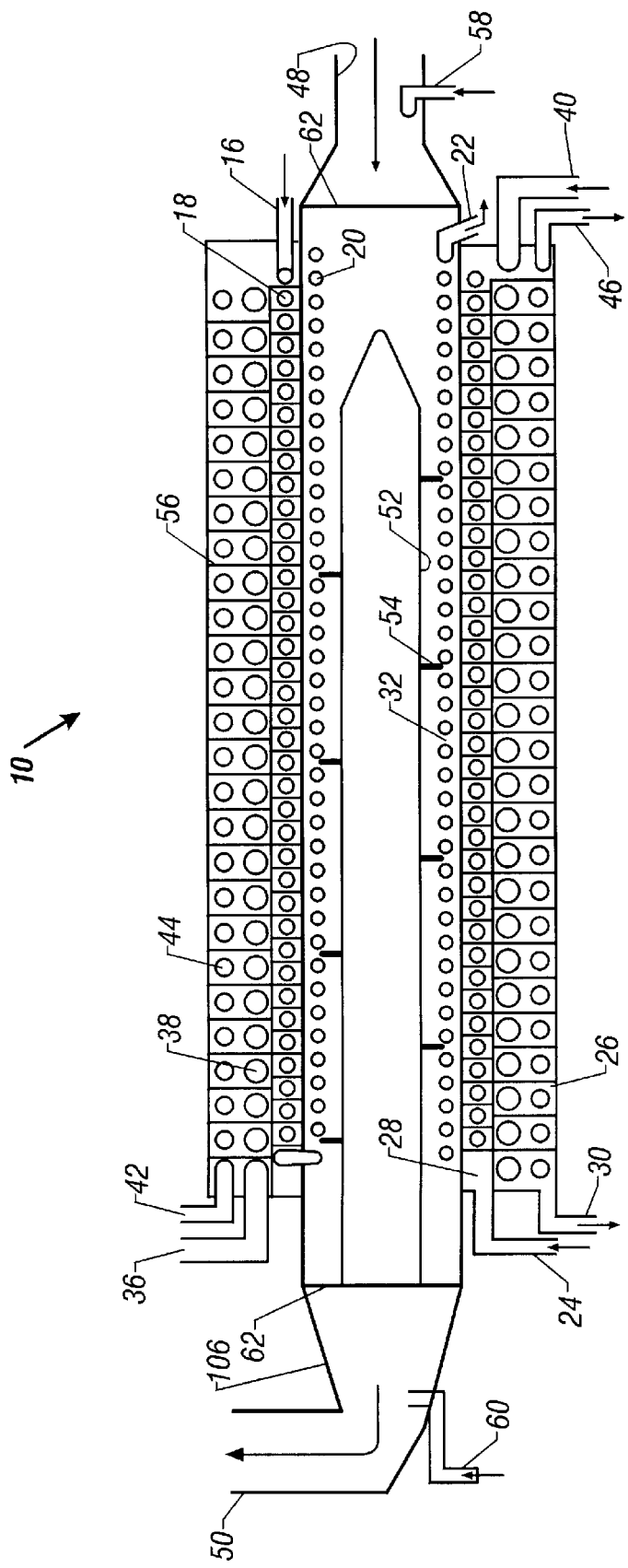
FIG. 2 is a cross-sectional view of heat exchanger taken along lines A—A in FIG. 1.

FIG. 2 is a cross-sectional view of heat exchanger 10 taken along lines A—A. The heat exchanger 10 has a first cylindrical chamber 26, a second cylindrical chamber 28, and a third cylindrical chamber 32. A first portion 18 of a first helical tube is positioned inside the second chamber 28 and a second portion 20 of the first helical tube is positioned inside the third chamber 32. Starting at the first end 12, the nitrogen inlet 16 communicates with the first portion 18 of the first helical tube and the nitrogen outlet 22 communicates with the second portion 20 of the first helical tube. Coolant inlet 24 communicates with the second chamber 28 near the second end 14, and coolant outlet 30 communicates with the first chamber near the second end 14. Hydraulic inlet 36 communicates with the second helical tube 38 near the second end 14, and hydraulic outlet 40 communicates with the first chamber near the first end 12. The exhaust inlet 48 communicates with the third chamber 32 near the first end 12, and the exhaust outlet communicates with the third chamber near the second end 14.

The exhaust chamber 32 may include a cylindrical core 52 for reducing sparks caused by the exhaust. The cylindrical core 52 may include spiral fin 54 positioned on the outside of the cylindrical core for dispersing the exhaust and increasing the surface area of the tubes 20 that are exposed to the heat from the exhaust, thereby maximizing the heat transfer therebetween. In addition to the cylindrical core 52, a diffuser 62 equipped with a cone shaped structure, positioned at each end of the third chamber may be used to reduce the noise from the exhaust.

Each chamber preferably includes a spiral fin that is positioned between the turns of at least some of the helical tubes to direct fluid flows and maximize the surface area of the tubes exposed to the fluids. Preferably, the fins can be made of any commercially available heat transfer medium so as to not inhibit the heat transfer from the fluid flow to the helical tubes.

The outer wall of the first chamber 26 can be made from steel, or preferably a heat transfer material such as brass. The walls of the second and third chambers may also be made from a heat transfer material such as steel, copper, brass or mixtures thereof, most preferably, brass, to maximize the radial heat transfer between the exhaust, hydraulic oil and the coolant.

Figure 3:
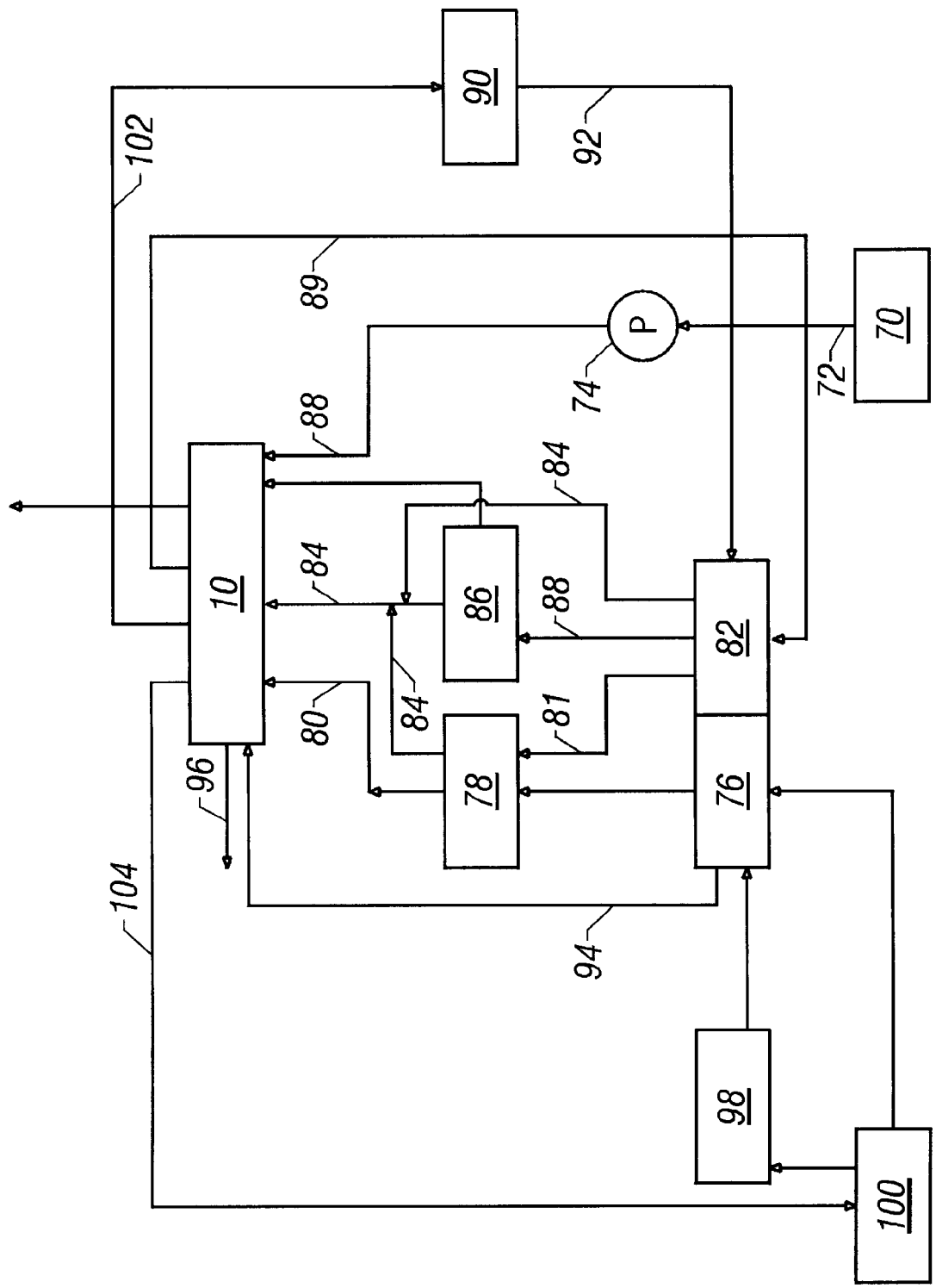
FIG. 3 is a schematic of a system using the heat exchanger of the present invention.

FIG. 3 is a schematic of a system using the heat exchanger of the present invention. A triplex nitrogen pump 74 is used to send nitrogen from a nitrogen source 70 through conduit 72 to the heat exchanger 10. The pump 74 is driven by a hydraulic motor 86. The engine 76 drives the hydraulic pump 82 which supplies hydraulic fluid to motor 86 and other hydraulic motors in the system. The coolant fluid from the engine 76 is pumped into the heat exchanger 10 through a coolant pump 78 and conduit 80. The case drain and return hydraulic fluid from a hydraulic pump 82, coolant pump 78 and hydraulic motor 86 are sent to the heat exchanger 10 through via conduit 84 and exit the heat exchanger through conduit 102 to a hydraulic fluid source 90. Main hydraulic fluid from hydraulic pump 82, rotary motor 86 is transferred to heat exchanger 10 through conduit 88 and returns to the hydraulic pump 82 through conduit 89 which completes a closed loop between hydraulic motor 86 and hydraulic pump 82. The hydraulic pump 82 is connected to a hydraulic fluid source 90 via conduit 92. The engine exhaust is transferred to the heat exchanger 10 through conduit 94 and exits the heat exchanger through conduit 96. Once the coolant exits the heat exchanger 10, it is transferred to either the engine radiator 98 or to the water pump in the engine 76. The coolant flow flows from the heat exchanger 10 through conduit 104 to a thermostatic valve 100 for regulating flow of the coolant, so that if the coolant temperature is too high the coolant is transferred to the engine radiator 98.

It is desirable for certain applications that the nitrogen be within a certain temperature range. In order to achieve a certain temperature range, a self-controlled tempering valve connected to a nitrogen source may be used to add liquid nitrogen to the nitrogen gas exiting the system if the temperature is too high.

Figure 4:
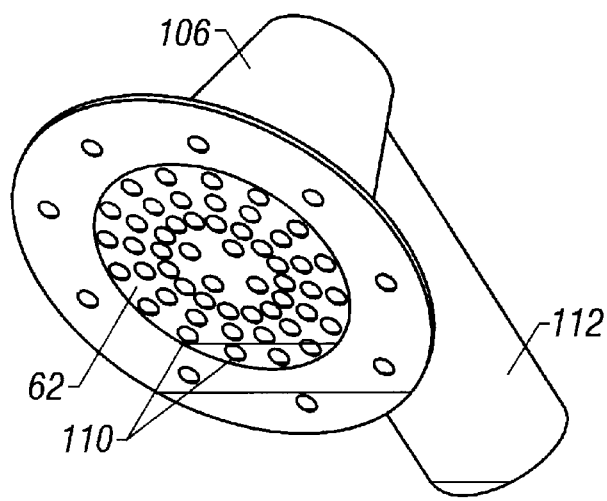
FIG. 4 is a perspective view of a cone and diffuser combination of the present invention.

FIG. 4 is a perspective view of a cone and diffuser combination that is positioned on each end of the heat exchanger. Only one cone and one diffuser is shown for simplicity. The cone 106 is attached, typically with bolts, to the ends of the heat exchanger, in communication with the exhaust flow through the heat exchanger. The cone has a diffuser 62 which consists of a generally flat plate defining holes 110 therethrough. The cone has an tube 112 extending away from the diffuser 62 for attachment to the exhaust source at one end of the heat exchanger or for venting the exhaust to the atmosphere at the other end. The diffuser 62 and cone 106 act to reduce engine noise.

Figure 5:
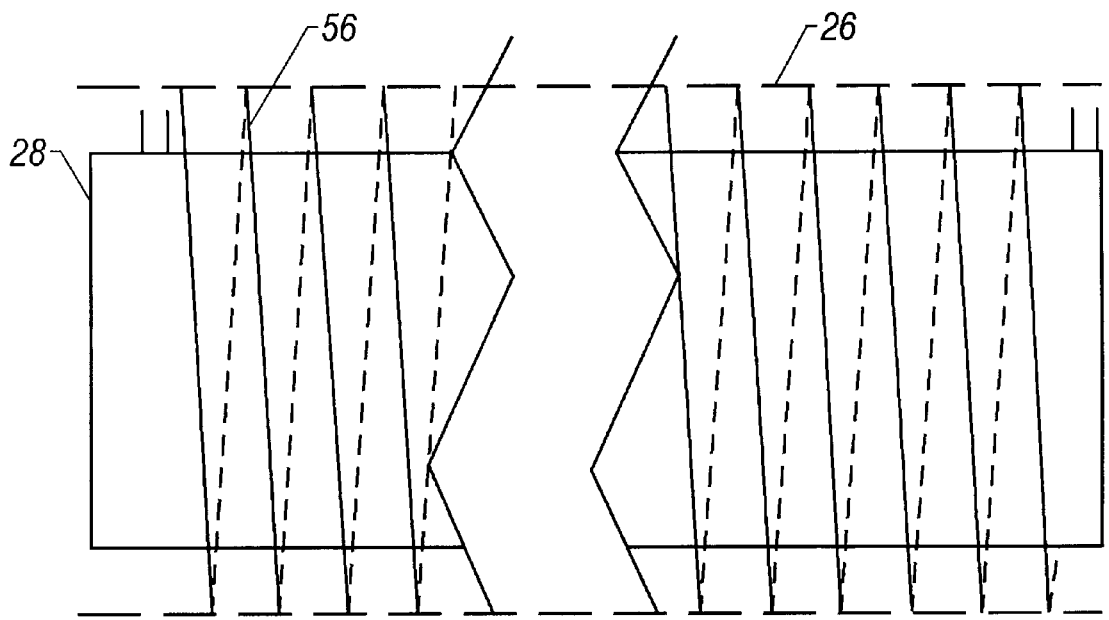
FIG. 5 is a schematic view of the spiral fins used in the present invention.

FIG. 5 is a schematic view of the spiral fins used in the present invention. For clarity, the first chamber 26 is shown in dotted lines and the helical tube has been removed. The fins 56 are positioned around the outside of the second chamber 28 for directing the fluid flow through the first chamber so that the fluid contacts the maximum surface area of the helical tube passing through the first chamber 26, thus increasing the heat transfer efficiency of the system.

While the foregoing is directed to the preferred embodiment of the present invention, other and further embodiments of the invention may be devised without departing from the basic scope thereof, and the scope thereof is determined by the claims which follow.

We claim:

1. A heat exchanger comprising:

a first chamber having at least one inlet;

a second chamber having at least one inlet, wherein the second chamber is positioned inside the first chamber;

a third chamber having at least one inlet, wherein the third chamber is positioned inside the second chamber, wherein said first, second, and third chambers are in coaxial alignment;

a first helical tube having an inlet, a first portion positioned inside the second chamber and a second portion positioned inside the third chamber; and a second helical tube having an inlet, wherein the second helical tube is positioned inside the first chamber.

2. The heat exchanger of claim 1, wherein the first tube has a first fluid flow therethrough, the second tube has a second fluid flow therethrough, the second chamber has a third fluid flow therethrough that flows to the first chamber and the third chamber has a fourth fluid flow therethrough, wherein the first, second, third, and fourth fluid flows do not mix.

3. The heat exchanger of claim 2, wherein the first fluid flow through the first portion of the first tube is in a counter-flow arrangement with the third fluid flow in the second chamber.

4. The heat exchanger of claim 2, wherein the first fluid flow through the second portion of the first tube is in a counter-flow arrangement with the fluid flow in the third chamber.

5. The heat exchanger of claim 2, wherein the second fluid flow through the second tube is in a counter-flow arrangement with the fluid flow in the first chamber.

6. The heat exchanger of claim 1, wherein the first, second and third chambers are generally cylindrical.

7. The heat exchanger of claim 1, wherein the second chamber is made from a heat conducting material.

8. The heat exchanger of claim 1, wherein the third chamber is made from a heat conducting material.

9. The heat exchanger of claim 2, further comprising a third helical tube having an inlet positioned inside the first chamber in parallel with the second helical tube.

10. The heat exchanger of claim 9, wherein the third helical tube has a fifth fluid flow therethrough, wherein the fifth fluid flow is in a counter-flow relationship with the fluid flow inside the first chamber.

11. The heat exchanger of claim 1, further comprising a first spiral fin positioned inside the first chamber, wherein at least some of the turns of the spiral fins are positioned between each turn of the second helical tube.

12. The heat exchanger of claim 1, further comprising a second spiral fin positioned inside the second chamber, wherein each turn of the second spiral fin is positioned between at least some of the turns of the first portion of the first helical tube.

13. The heat exchanger of claim 1, further comprising a cylindrical core positioned inside the third chamber.

14. The heat exchanger of claim 13, further comprising spiral fins positioned on an exterior surface of the cylindrical core.

15. A heat exchanger comprising, a plurality of coaxially aligned chambers for providing radial, thermal heat transfer between four separately contained fluids, a first helical tube having an inlet within at least one of the chambers and a second helical tube having an inlet within one of the chambers, wherein the plurality of chambers includes a first chamber having at least one inlet;

a second chamber having at least one inlet, positioned inside the first chamber;

a third chamber inside the second chamber, having at least one inlet;

wherein the first helical tube has a first portion positioned inside the second chamber and a second portion positioned inside the third chamber; and the second helical tube is positioned inside the first chamber.

16. The heat exchanger of claim 15, wherein the first tube has a first fluid flow therethrough, the second tube has a second fluid flow therethrough, the second chamber has a third fluid flow therethrough that flows to the first chamber and the third chamber has a fourth fluid flow therethrough.

17. The heat exchanger of claim 16, wherein, the first fluid flow is in heat exchange relation with the third fluid flow within the second chamber and the first fluid flow is in heat exchange relation the fourth fluid flow within the third chamber; and the second fluid flow is in heat exchange relation with the third fluid flow in the first chamber.

18. The heat exchanger of claim 17, wherein the third fluid and the first fluid flow are in a counter-flow relationship in the second chamber, the third fluid and the second fluid flow are in a counter-flow relationship in the first chamber, and the fourth fluid flow and the first fluid flow are in a counter-flow relationship in the third chamber.

19. The heat exchanger of claim 15, wherein the first, second and third chambers are generally cylindrical.

* * * * *